(12) United States Patent
Nakayama

(10) Patent No.: US 7,908,071 B2
(45) Date of Patent: Mar. 15, 2011

(54) ELECTRIC PARKING BRAKE CONTROL SYSTEM

(75) Inventor: Daisuke Nakayama, Tokyo (JP)

(73) Assignee: Fuji Jukogyo Kabushiki Kaisha, Shinjuku-ku, Tokyo (JP)

( * ) Notice: Subject to any disclaimer, the term of this patent is extended or adjusted under 35 U.S.C. 154(b) by 542 days.

(21) Appl. No.: 11/905,722

(22) Filed: Oct. 3, 2007

(65) Prior Publication Data

US 2008/0086252 A1    Apr. 10, 2008

(30) Foreign Application Priority Data

Oct. 6, 2006  (JP) ................................ P2006-274986

(51) Int. Cl.
*G06F 19/00*  (2006.01)
(52) U.S. Cl. .......................................... 701/70; 180/282
(58) Field of Classification Search .................. 701/200, 701/70; 303/3; 180/282; 254/419; 280/6.153; 33/366.24
See application file for complete search history.

(56) References Cited

U.S. PATENT DOCUMENTS 6,447,074 B2 *  9/2002  Engelhard .......................... 303/3
7,017,701 B2 *  3/2006  Flynn et al. .................... 180/282

FOREIGN PATENT DOCUMENTS

JP        2004-142517        5/2004

* cited by examiner

*Primary Examiner* — Mark Hellner
(74) *Attorney, Agent, or Firm* — McGinn iP Law Group PLLC

(57) ABSTRACT

An electric parking brake control apparatus for controlling an electric actuator for driving a parking brake is provided with: an inclination determination unit for determining an inclination of a road surface based on at least a change of a vehicle speed; and a braking force setting unit. The braking force setting unit sets a braking force of the parking brake to a slope braking force which is larger than a flat ground braking force set when the vehicle is stopped on a flat ground, according to an inclination of the road surface which is determined by the inclination determination unit. Moreover, in the event that the vehicle is stopped again without experiencing a running over a predetermined vehicle speed after braking with the slope braking force has been cancelled, the braking force setting unit sets the braking force to the slop braking force.

18 Claims, 7 Drawing Sheets

ELECTRIC PARKING BRAKE CONTROL SYSTEM

This application claims foreign priority from Japanese Patent Application No. 2006-274986 filed on Oct. 6, 2006, the entire contents of which are hereby incorporated by reference.

BACKGROUND OF THE INVENTION

1. Field of the Invention

The present invention relates to an electric parking brake control apparatus which is provided on a vehicle such as a motor vehicle.

2. Related Art

An electric parking brake drives a parking brake for holding a vehicle when it is parked or stopped by using an electric actuator such as a motor.

According to the electric parking brake, since a driver of the vehicle can operate the parking brake by an electric switch, labor involved in operating the parking brakes can be reduced compared with a hand-operated lever or foot-operated pedal which is generally used.

In addition, in the electric parking brake, the addition of a "hill hold (hill holder)" function has been proposed. The hill hold function is a function to prevent the unintentional movement of a vehicle by automatically activating the electric parking brake when the vehicle is stopped on a slope.

A braking force needed in the hill hold function differs depending upon the inclination (gradient) of a road surface or slope on which the vehicle is stopped, and for example, in order to prevent the vehicle from starting to move on a steep slope, a large braking force needs to be set. However, in the event that such a large braking force is generated at all times, the load to be borne by the electric parking brake apparatus is increased, and energy necessary for driving the apparatus is also increased.

Therefore, in the conventional electric parking brake apparatus, there is known one in which an acceleration (G) sensor as an inclination sensor for detecting the inclination of a road surface is installed so that the braking force is changed according to an output from the inclination sensor (for example, refer to JP-A-2004-142517).

In the case of using the G sensor as the inclination sensor, however, since deceleration G or deceleration G attributed to pitching or the like of the vehicle is detected while the vehicle is being decelerated or immediately after the vehicle is stopped, the accuracy with which inclination is determined is deteriorated. As a result, there is caused a time lag of the order of 2 seconds, for example, before an inclination can be determined accurately after the vehicle is stopped.

Therefore, there has been proposed to determine an inclination by comparing a change of a vehicle speed sensor immediately before the vehicle is stopped with a longitudinal G of the vehicle according to the G sensor. According to this proposal, an inclination can be determined within a short period of time after the vehicle is stopped. However, it is generally difficult to detect low vehicle speed with the vehicle speed sensor Therefore, in the case that the vehicle is stopped after transferring from no low-speed running to low-speed running, it is possible to determine inclination accuracy with the vehicle speed sensor, meanwhile, in the case that the vehicle is stopped again after the vehicle runs again in low-speed without experiencing no low-speed running, it is impossible to determine inclination accuracy. Therefore, in the event that the vehicle repeats a low-speed running and a stopping as when it is involved in a traffic jam on a slope, there maybe a case where it becomes difficult to secure the inclination determination accuracy.

In addition, in the case of a vehicle with a manual transmission it is expected to prevent the vehicle from moving in the event that the engine stalls.

SUMMARY OF THE INVENTION

One or more embodiments of the invention provide an electric parking brake control apparatus which can activate a hill hold function more adequately.

According to one or more embodiments of the present invention, an electric parking brake control apparatus for controlling an electric actuator for driving a parking brake is provided with: an inclination determination unit configured to determine an inclination of a road surface based on at least a change of a vehicle speed; and a braking force setting unit configured to set a braking force of the parking brake to a slope braking force according to the inclination of the road surface determined by the inclination determination unit when a vehicle is stopped on a slope. The slope braking force is larger than a flat ground braking force set when a vehicle is stopped on a flat ground. The braking force setting unit sets the braking force to the slope braking force, in the event that the vehicle is stopped again without experiencing a running over a predetermined vehicle speed after braking with the slope braking force has been cancelled by a restart of the vehicle.

In the electric parking brake control apparatus, in the event that the vehicle is stopped again without experiencing the running over the predetermined vehicle speed after braking with the slope braking force has been cancelled, the braking force setting unit may activate the parking brake with the slope braking force even when an inclination determination by the inclination determination unit has not been established.

In the electric parking brake control apparatus, the predetermined vehicle speed may be set based on a lower limit vehicle speed at which an inclination determination is enabled in the inclination determination unit.

In the electric parking brake control apparatus, in the event that the vehicle is stopped again without experiencing the running over the predetermined vehicle speed after braking with the slope braking force has been cancelled, the braking force setting unit may set the braking force to the flat ground braking force when a flat ground determination is established by the inclination determination unit.

In the electric parking brake control apparatus, the inclination determination unit may determine the inclination by comparing the change of the vehicle speed with an output of an acceleration sensor.

In the electric parking brake control apparatus, the inclination determination unit may determine the inclination by an output of the acceleration sensor after the vehicle is stopped and a predetermined time elapses, the braking force setting unit may set the braking force based on the output of the acceleration sensor after the vehicle is stopped and the predetermined time elapses, in the event that the inclination determination unit determines the flat ground based on the change of the vehicle speed while running.

Moreover, according to one or more embodiments of the present invention, an electric parking brake control apparatus for controlling an electric actuator for driving a parking brake is provided with: an inclination determination unit configured to determine an inclination of a road surface; and a braking force setting unit configured to set a braking force of the parking brake to a slope braking force according to an inclination of the road surface determined by the inclination determination unit when the vehicle is stopped on a slope. The slope braking force is larger than a flat ground braking force set when a vehicle is stopped on a flat. The braking force setting unit sets the parking brake to the slope braking force in the event that braking with the slope braking force has been cancelled and an engine is being stopped.

According to the embodiments of the invention, the following advantages can be obtained.

(1) Even when the vehicle is stopped again in the condition that it is impossible to determine inclination accuracy due to the lack of vehicle speed, the parking brake apparatus can activate the hill hold function more adequately due to setting the slope braking force set at last stopping larger than the flat braking force (2) Even when the inclination determination by the inclination determination unit is not established, by activating the parking brake with the slope braking force, activating the hill hold function more adequately can be realized by a simple control logic.

(3) By setting the predetermined vehicle speed based on the lower limit vehicle speed at which the inclination determination is enabled in the inclination determination unit, in the event that a higher vehicle speed is reached, the control is switched to a control which utilizes the normal inclination determination, so as to optimize the setting of a braking force.

(4) When the flat ground determination by the inclination determination unit is established, the flat ground braking force is set, so as to relax the requirement on the durability of the apparatus while optimizing the setting of a braking force.

(5) By determining the inclination by compared the change of the vehicle speed with an output of an acceleration sensor, the inclination determination can be realized by a small number of sensors and simple control logic.

(6) Even when flat ground is determined based on the change of the vehicle speed while running, the braking force is set based on the acceleration sensor after the vehicle is stopped and the predetermined time elapsed, on the other hand, in the event that inclination is determined based on the change of the vehicle speed while running, the braking force is set according to the inclination calculated by the change of the vehicle speed after the vehicle is stopped and the predetermined time is elapsed. Therefore, the braking force is set to the side where it can prevent movement of the vehicle more adequately.

(7) In the event that the engine stalls after braking with the slope braking force has been cancelled, by activating the parking brake with the slope braking force, the vehicle can be prevented from movement of the vehicle.

Other aspects and advantages of the invention will be apparent from the following description and the appended claims.

DETAILED DESCRIPTION OF THE EXEMPLARY EMBODIMENTS

Embodiment

Hereinafter, an embodiment of an electric parking brake apparatus, which includes an electric parking brake control apparatus to which an exemplary embodiment of the invention is applied, will be described. In the embodiment, a vehicle is, for example, a passenger car fitted with an internal combustion engine and a manual transmission.

Figure 1:
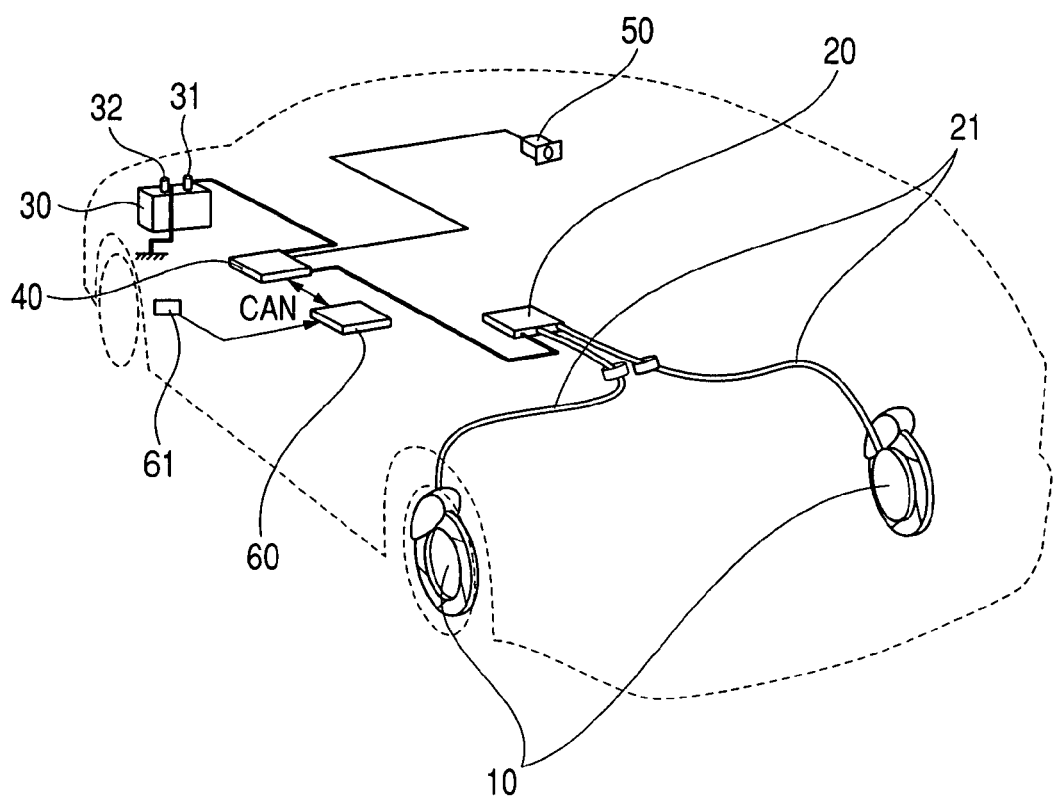
[FIG. 1] A diagram showing a mechanical configuration of an embodiment of an electric parking brake apparatus to which the invention is applied.

FIG. 1 is a diagram showing a mechanical configuration of an electric parking brake apparatus of the embodiment.

Figure 2:
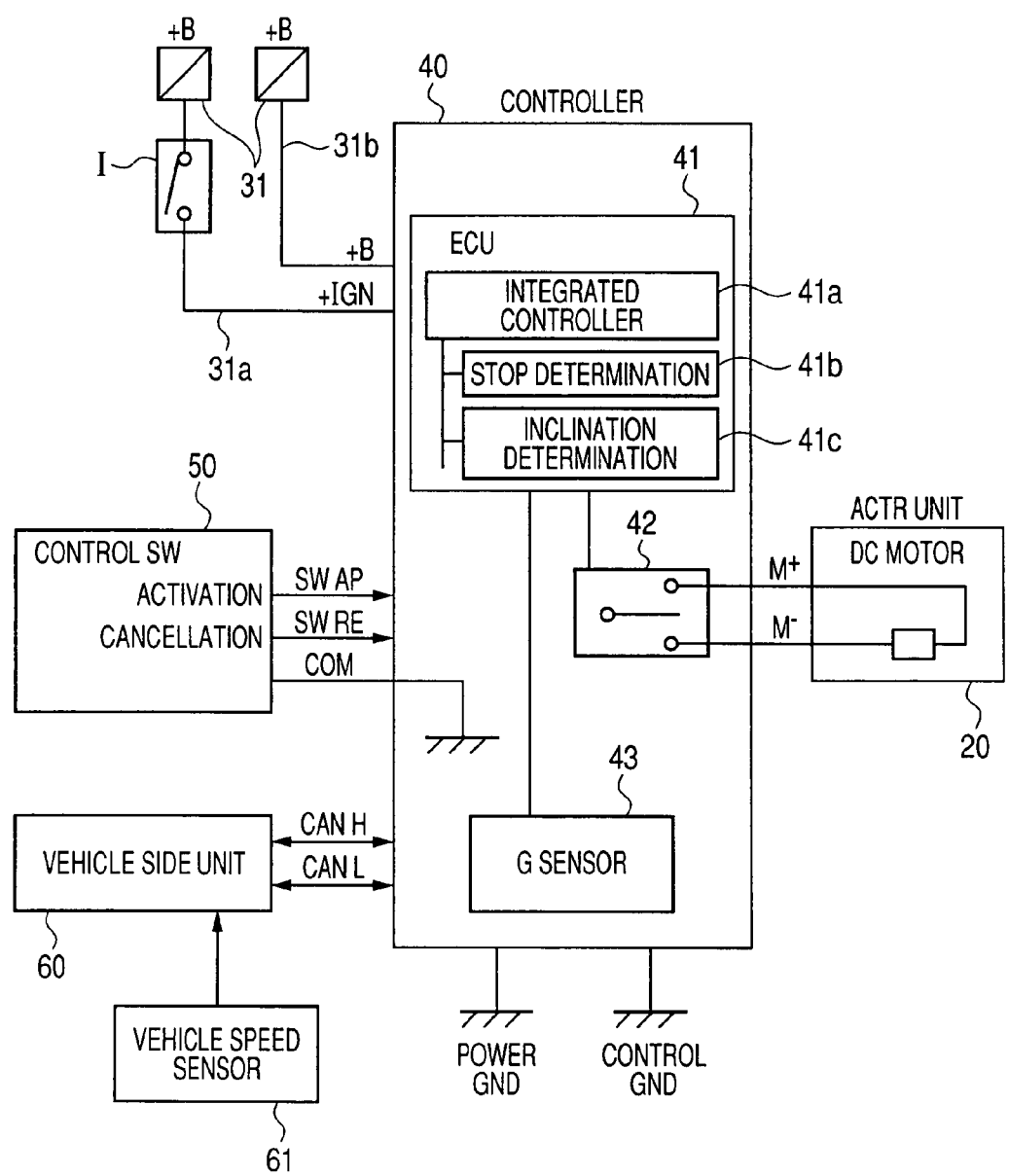
[FIG. 2] A block diagram showing a circuit configuration of the electric parking brake apparatus shown in FIG. 1.

FIG. 2 is a block diagram showing a circuit configuration of the electric parking brake apparatus.

The electric parking brake apparatus includes parking brakes 10, an actuator unit 20, a battery 30, a controller 40, a control switch 50 and a vehicle side unit 60.

The parking brakes 10 are each, a brake device for preventing the movement of the vehicle by braking wheels of the vehicle, for example, when it is parked or stopped and are provided on wheel hub portions of left and right rear wheels, respectively. The parking brake 10 is of a so-called drum-in-disc type which includes a brake drum, not shown, which is disposed on an inside diameter side of a rotor of a disc brake that is used as a foot brake (a service brake) and a brake shoe, not shown, which is pressed to be brought into contact with an inside diameter side of the brake drum when the brake is applied.

The actuator unit 20 is such as to drive the brake shoe of the parking brake 10 so as to shift it between a braking state in which the parking brake 10 generates a braking force and a released state where the parking brake 10 generates substantially no braking force. The actuator unit 20 includes parking brake cables 21 and is fixed to, for example, a floor panel portion of the vehicle.

The actuator unit 20 is such that a rotational force of, for example, a direct current (DC) motor is reduced by a reduction gear train so as to rotate a lead screw, whereby the parking brake cables 21 are pulled or loosened by an equalizer which is thread connected to the lead screw.

The parking brake cables 21 are provided in such a manner as to correspond to the left and right parking brakes 10, respectively, and each have flexibility so that the cables can be deformed according to strokes of rear suspensions, not shown. The parking brake cables 21 are made up of Bowden cables which put the parking brakes 10 into the braking state when pulled and put the parking brakes 10 into the released state when loosened.

Here, the actuator 20 has a function to change the braking forces of the parking brakes 10 which are in the braking state by adjusting the pulling force exerted on the parking brake cables 21. The adjustment of the pulling force is implemented by changing a stroke along which the parking brake cables 21 are pulled, and to make this happen, the actuator 20 includes a stroke sensor, not shown, for detecting a pulling stroke.

The battery 30 is a secondary battery that is used as a main power supply for an electrical system of the vehicle and which uses a lead battery or the like which includes a battery of a rated output of 12V. The battery 30 includes a positive terminal 31 and a negative terminal 32.

The positive terminal 31 is connected to the controller 40 via a wiring (harness). As is shown in FIG. 2, the wiring that supplies electric power from this positive terminal 31 to the controller 40 has an ignition wiring 31a and a normally connected wiring 31b. An ignition relay I, which is switched between energization and interruption in conjunction with switching on and off an ignition switch, not shown, is inserted in an intermediate portion along the length of the ignition wiring 31a, so as to be energized when an engine, not shown, which is a power source for running the vehicle, is on (in operation). In addition, the normally connected wiring 31b is normally energized irrespective of the state of the ignition switch, so as to be used for holding data in an interior of the controller.

In addition, as is shown in FIG. 1, the negative terminal 32 is grounded to a metallic portion of a vehicle body.

The controller 40 constitutes an electric parking brake control apparatus for controlling the actuator unit 20 in response to an input from the control switch 50 so as to change the pulling force of the parking brake cables 21 to thereby switch the parking brakes 10 between the braking state and the released state and changing the braking force and includes an ECU 41, a relay 42 and a G sensor 43.

The ECU 41 includes a CPU for determining whether or not the parking brakes 10 need to be applied in response to inputs from the control switch 50, the vehicle side unit 60 and performing a reapplication (hill hold) control, which will be described later on, and a hill hold backup control. The ECU 41 includes an integrated controller 41a, a stop determination unit 41b and an inclination determination unit 41c.

The integrated controller 41a is such as to control the stop determination unit 41b and the inclination determination unit 41c and the like in a supervisory fashion.

The stop determination unit 41b is such as to perform a vehicle stop determination operation for determining that the vehicle is shifted from a running state to a stopped state.

The inclination determination unit 41c is such as to perform a known inclination determination operation for determining an inclination of a road surface or slope on which the vehicle is stopped by processing an output from a G sensor 43, as well as an inclination determination operation for comparing the output from the G sensor 43 with the reduction rate of vehicle speed. This inclination determination operation will be described in detail later.

The relay 42 is such as to supply driving electric power to the actuator 20 in response to a control signal outputted from the ECU 41, includes a function to reverse the polarity of driving electric power for shifting the parking brakes 10 from the braking state to the relaxed state and shifting the parking brakes 10 from the relaxed state to the braking state and is adapted to stay in a neutral state in which the energization with the actuator 20 is interrupted when the actuator 20 is in any other states than a state where it is being driven.

The G sensor 43 is such as to include an acceleration sensor for detecting acceleration which acts in a longitudinal direction of the vehicle and to input its output into the ECU 41. In addition, in this specification, the polarity (positiveness, negativeness) of acceleration acting in the longitudinal direction of the vehicle will be described as a deceleration side being positive and an acceleration side being negative.

The control switch 50 is a control portion from which a selection of the braking state or relaxed state of the parking brakes 10 is manually inputted by the user such as the driver and includes a push button or the like which is mounted, for example, on an instrument panel, not shown, of the vehicle. The control switch 50 transmits what has been inputted therethrough to the ECU 41 of the controller 40, and the controller 40 then supplies the driving electric power to the actuator unit 20 in response to the input so made into the ECU 41, so as to drive the parking brakes 10.

The vehicle side unit 60 includes, for example, an engine control unit (ECU) for controlling the engine of the vehicle, a driving stability control unit for performing a driving stability control of the vehicle including an ABS control and a vehicle integrated unit for controlling other electrical equipment of the vehicle in a supervisory fashion and is made to communicate with the controller 40 and a CAN communication system which is a type of an onboard LAN. In addition, the vehicle side unit 60 includes vehicle speed sensors 61.

The vehicle speed sensors 61 are provided, for example, in wheel hub portions of respective road wheels, respectively, so as to output vehicle speed pulse signals according to rotational speeds of tone wheels which rotate together with the road wheels to thereby be used to detect a running speed (vehicle speed) of the vehicle.

The vehicle side unit 60 sequentially provides the ECU 41 of the controller 40 with information such as engine revolution speed, accelerator (throttle) opening or position, shift position of a transmission, operating condition of the foot or service brake, vehicle speed and the like. In an automatic operation mode (an auto mode), the controller 40 determines whether the vehicle is in a stopped state or a running state based on the pieces of information so inputted thereinto, and puts the parking brakes 10 in the braking state if no start-up operation is performed with the vehicle kept in the stopped state and puts the parking brakes 10 in the released state in other cases.

In addition, the electric parking brake apparatus of the embodiment has a hill hold (hill holder) function for preventing the start of the vehicle when it is stopped on a slope by increasing the braking force (reapplying the brakes) further than when the vehicle is stopped on the flat ground.

An inclination determination method that is used in this hill hold function will be described in detail herebelow.

Figure 3:
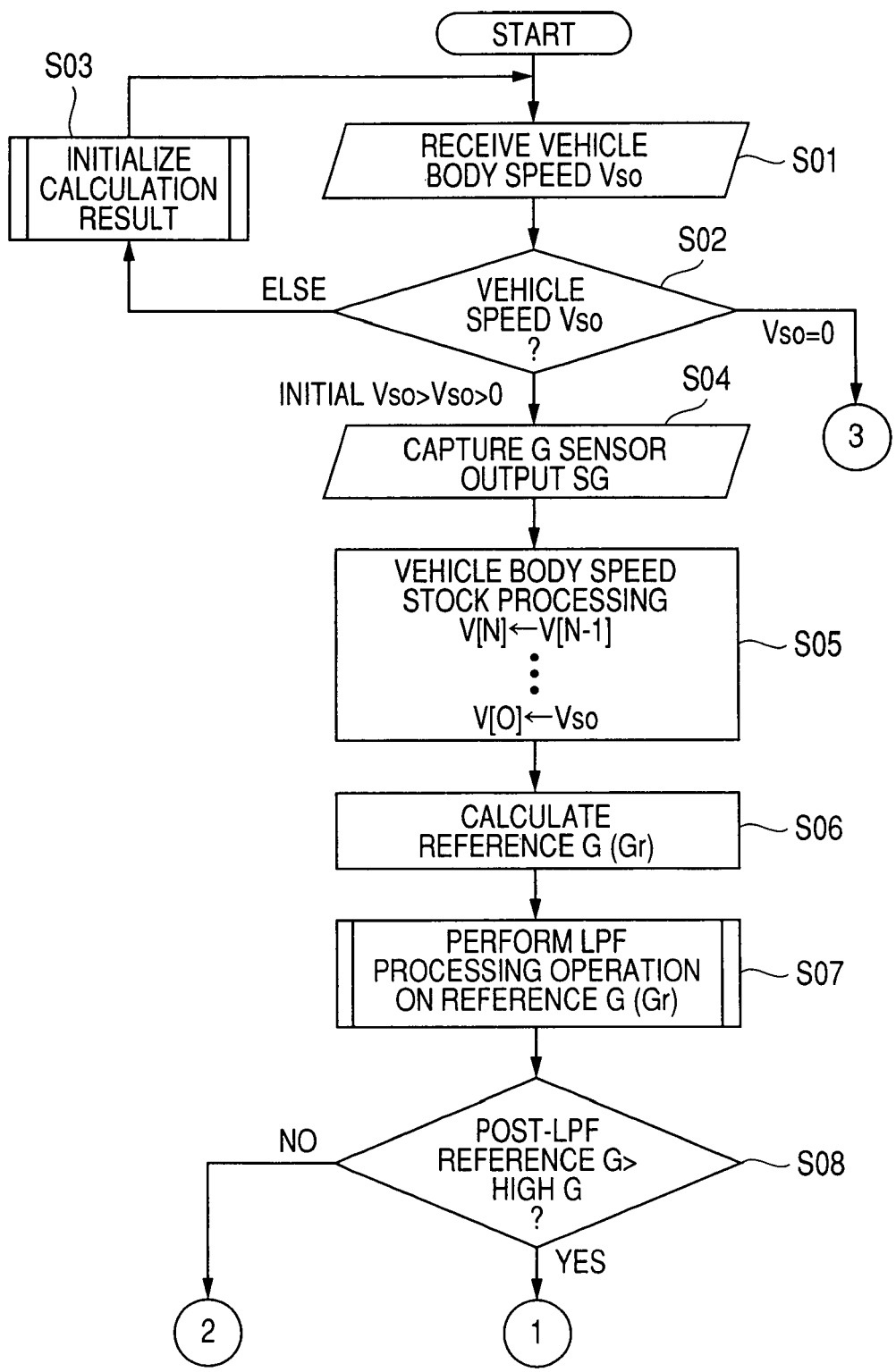
[FIG. 3] A first partial diagram of a flowchart showing an inclination determination in the electric parking brake apparatus shown in FIG. 1.

FIG. 3 is a first partial diagram of a flowchart showing an inclination determination method according to the embodiment, the diagram showing a main routine of the inclination determination method.

Figure 4:
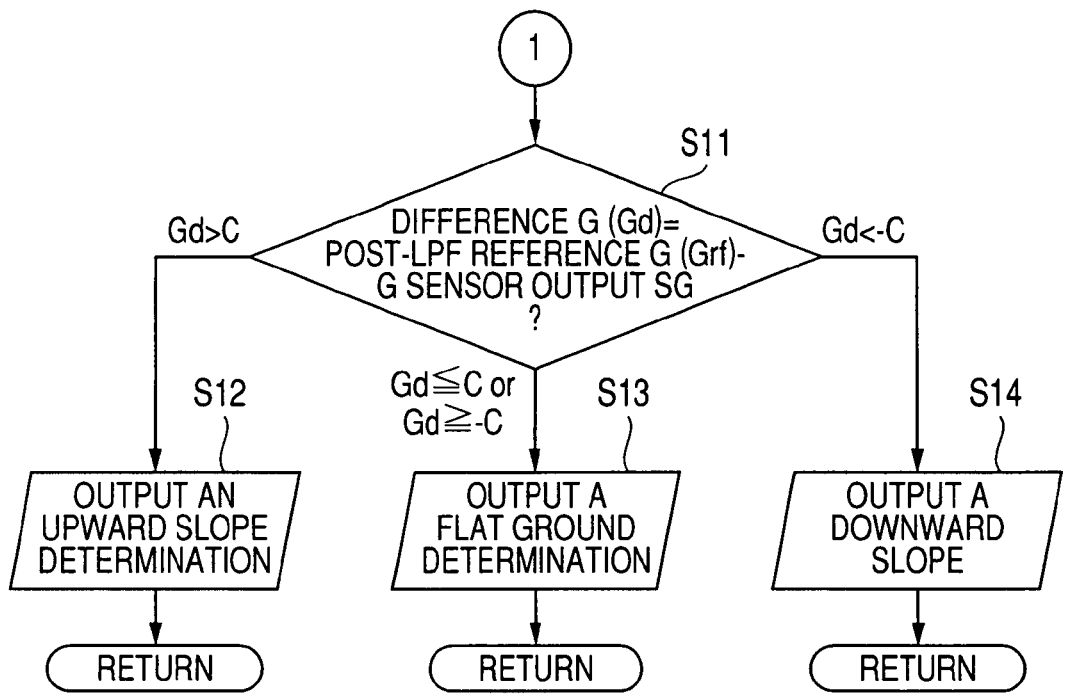
[FIG. 4] A second partial diagram of a flowchart showing an inclination determination in the electric parking brake apparatus shown in FIG. 1.

FIG. 4 is a second partial diagram of the flowchart, the diagram showing a subroutine of an inclination determination in a normal G region.

Figure 5:
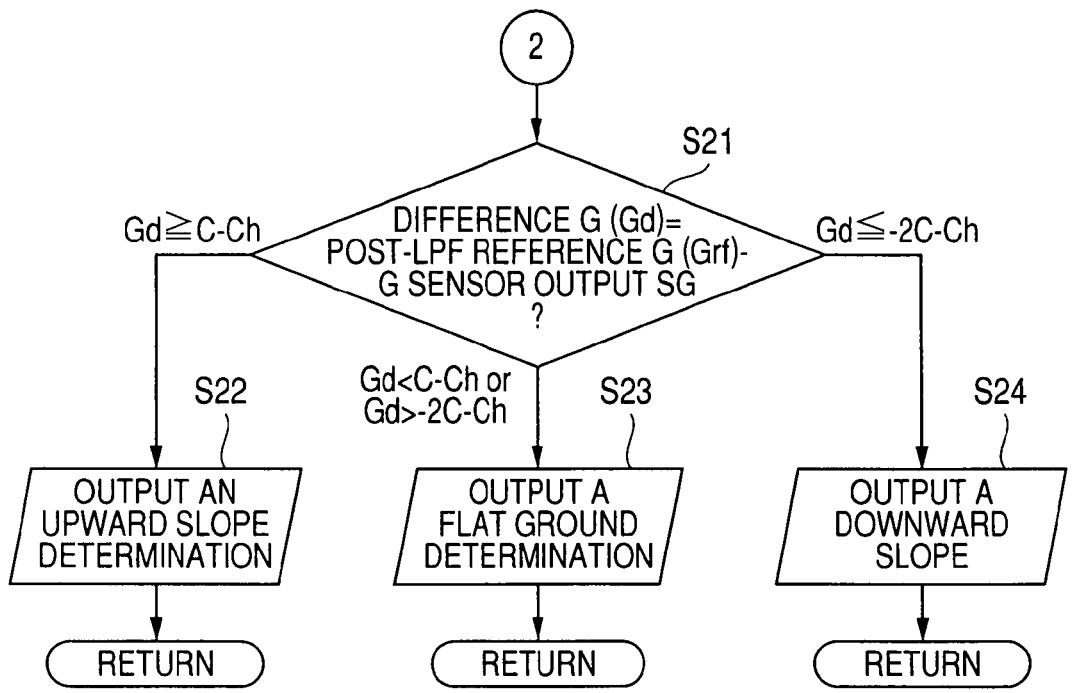
[FIG. 5] A third partial diagram of a flowchart showing an inclination determination in the electric parking brake apparatus shown in FIG. 1.

FIG. 5 is a third partial diagram of the flowchart, the diagram showing a subroutine of an inclination in a high G region.

Figure 6:
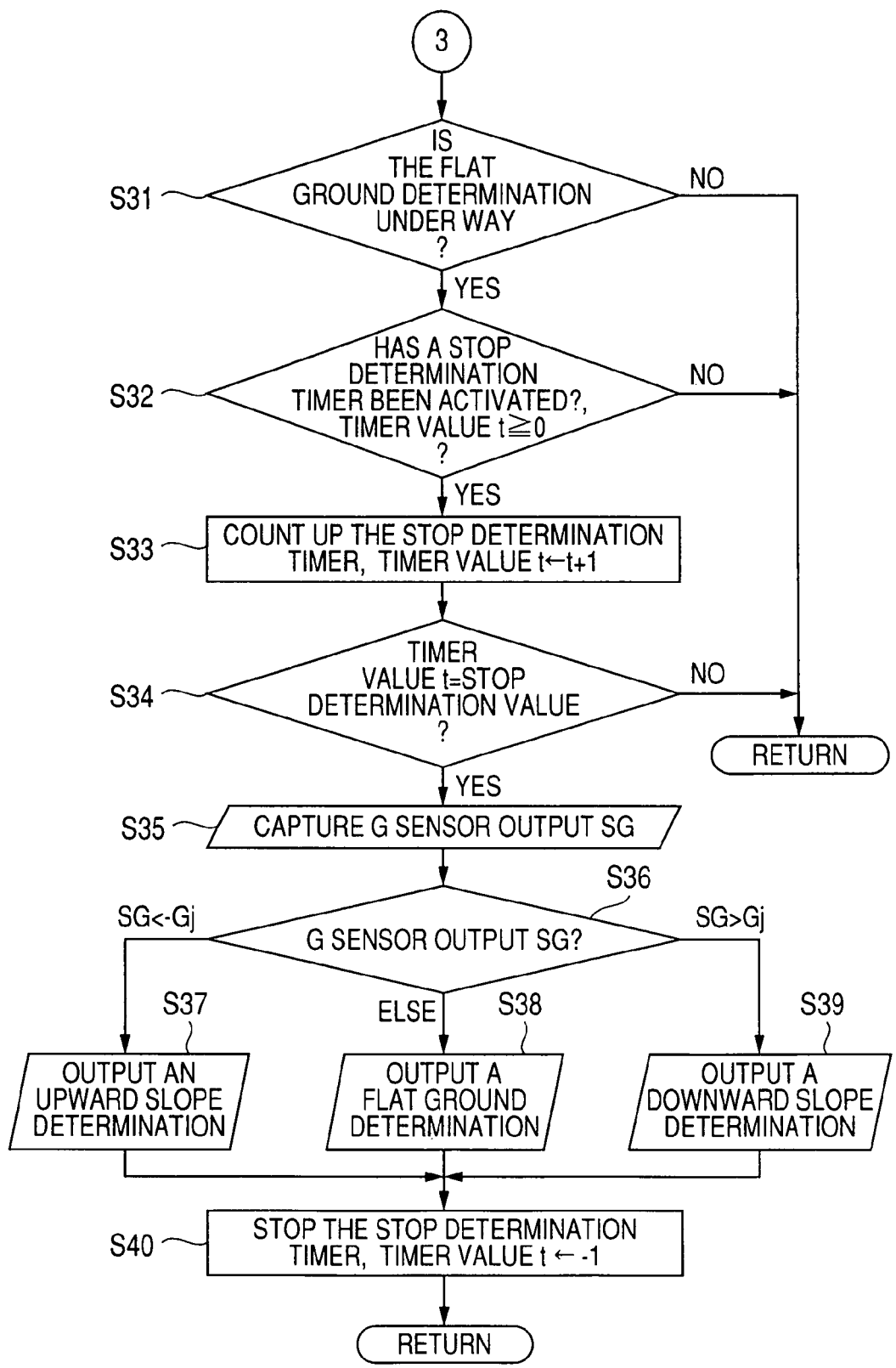
[FIG. 6] A fourth partial diagram of a flowchart showing an inclination determination in the electric parking brake apparatus shown in FIG. 1.

FIG. 6 is a fourth partial diagram of the flowchart, the diagram showing a subroutine of an inclination determination for back-up.

Hereinbelow, the inclination determination method will be described step by step.

<Main Routine>
<Step S01: Reception of Vehicle Body Speed Vso>

The ECU 41 of the controller 40 receives a vehicle speed (vehicle speed) Vso which is a running speed of the vehicle which was detected by the vehicle side unit 60 which used the vehicle speed sensor 61, and the operation flow proceeds to step S02.

<Step S02: Determination of Vehicle Body Speed Vso>

The ECU 41 compares the current vehicle speed Vso with a Vso (an initial Vso) resulting when a processing operation was started, and if the current vehicle speed Vso is smaller than the initial Vso but is larger than 0, the operation flow proceeds to step S04, while if the current vehicle speed Vso is 0, the operation flow proceeds to step S31 (refer to FIG. 6) to start an inclination determination subroutine for back-up which is to be deployed from the relevant step onward for accomplishment.

In addition, if in other cases, the operation flow proceeds to step S03.

<Step S03: Initialization of Calculation Results>

The ECU 41 deletes all internal operation results including the aforesaid steps S01 and S02 and resets respective parameters such as V[0, . . . N], Gr, Grf and the like, and the operation flow returns to step S01 to repeat the operations thereafter.

<Step S04: Capture of G Sensor Output SG>

The ECU 41 captures an output SG from the G sensor 43, and the operation flow proceeds to step S05. Here, the sign of the output SG of the G sensor 43 is set such that that a deceleration side becomes positive, while an acceleration side becomes negative.

<Step S05: Stock Processing of Vehicle Speed V>

The ECU 41 updates accumulated time series vehicle speed data V[N] (N: integer) with V[N-1], respectively and performs a stock processing to make the current vehicle speed Vso be V[0], and the operation flow proceeds to step S06.

<Step S06: Calculation of Reference G (Gr)>

The ECU 41 calculates a reference G (Gr) which is a deceleration of the vehicle which is obtained by operation based on an output of the vehicle speed sensor 61, and the operation flow proceeds to step S07.

$$Gr(m/s^2) = (V[N] \text{ (km/h)} - V[0] \text{ (km/h)})/(T \times N) \times 1000/3600 \quad \text{(Equation 1)}$$

where, T: reception interval (s) of vehicle speed Vso.

<Step S07: LPF Processing of Reference G>

The ECU 41 performs a predetermined low-pass filter (LPF) processing on the reference G (Gr) which was calculated in step S06, so as to generate a post-LPF reference G (Grf), and the operation flow proceeds to step S08.

Here, in the event that the vehicle is decelerated on the flat ground in such a state that the inclination of the vehicle body can be ignored, the G sensor 43 is regulated with respect to its gain in such a manner that its output SG becomes substantially the same as the post-LPF G (Grf).

<Step S08: Determination of Post-LPF G>

The ECU 41 compares the post-LPF reference G (Grf) which was generated in step S07 with a high reference G determination value (High G) which is a threshold value for stratifying the deceleration of the vehicle into a predetermined high G region and a normal region in which deceleration becomes smaller than that in the high G region. Then, if the post-LPF reference G is larger than the high reference G determination value, the operation flow proceeds to an inclination determination subroutine in the normal G region which is deployed from step S11 (refer to FIG. 4) onward, and if in other cases, the operation flow proceeds to an inclination determination subroutine in the high G region which will be deployed from step S21 (refer to FIG. 5) onward.

<Inclination Determination Subroutine in Normal G region>

<Step S11: Determination of difference G>

The ECU 41 calculates a difference G (Gd) which results by subtracting the G sensor output SG from the post-LPF reference G (Grf) and compares this difference G (Gd) with a determination value C (C>0) which is a predetermined constant and −C which results from reversing the sign (positive/negative) of the determination value C.

Then, if the difference G (Gd) is larger than C, the operation flow proceeds to step S12, if the difference G (Gd) is smaller than −C, the operation flow proceeds to step S14, and if the difference G (Gd) is equal to or smaller than C but is equal to or larger than −C, the operation flow proceeds to step S13.

Herebelow, a principle will be described of determination of an inclination of a road surface through the comparisons described above.

Figure 7:
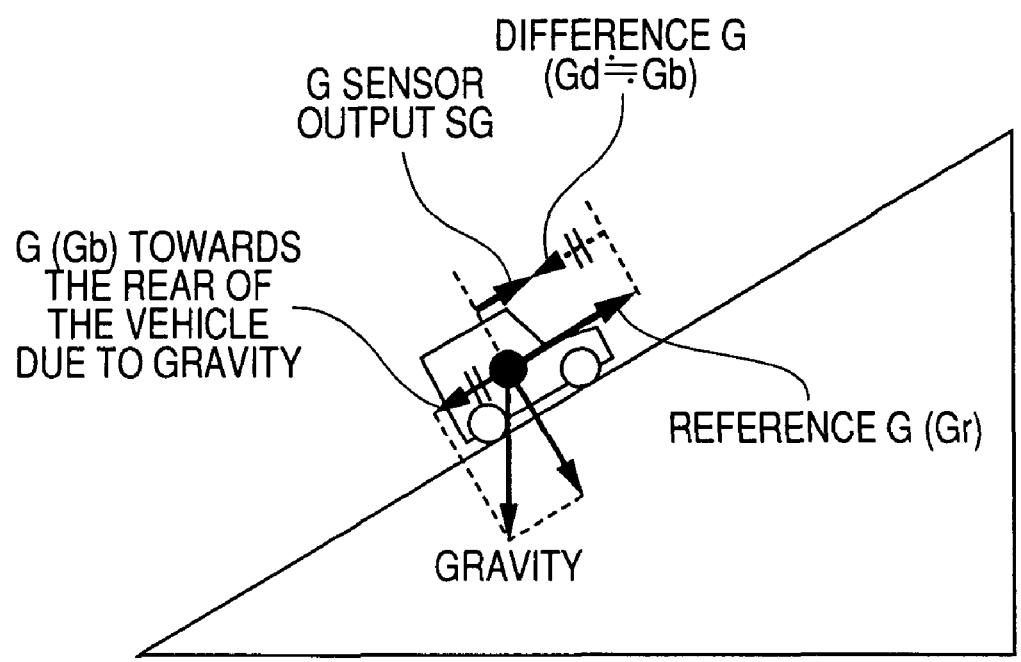
[FIG. 7] An exemplary diagram showing a relationship between a G sensor output and a reference G when the vehicle is stopped on an upward slope.

FIG. 7 is an exemplary diagram showing a relationship between the G sensor output when the vehicle is stopped on an upward slope and the reference G.

Since the G sensor output SG is a combination of deceleration G due to reduction in speed of the vehicle and a G that is generated by the inclination of the vehicle that is attributed to the inclination or the like of the road surface, even in case decelerations of the vehicle are the same, in the event that inclinations of road surfaces are different, a different G sensor output SG is then outputted. For example, in the case of an upward slope shown in FIG. 7, a G (Gb) which acts towards the rear (acceleration side) of the vehicle is generated by the effect of gravity, whereby the G sensor output SG becomes small.

In contrast to this, since the reference G is the reduction rate of a vehicle speed that is detected by the vehicle sensor 61, the effect of inclination of the road surface can substantially be ignored, and it is hence considered that the reference G substantially represents only deceleration G.

Because of this, by eliminating the effect of the deceleration G from the G sensor output SG by obtaining the difference G (Gd) between the G sensor output SG and the reference G, a G attributed to the inclination of the road surface can be detected.

A value (the difference G (Gd)) which is obtained by subtracting the G sensor output SG from the post-LPF reference G (Grf) is substantially equal to a G generated in the longitudinal direction of the vehicle, and the value becomes positive (on the deceleration side) in the case of an upward slope, while the value becomes negative (on the acceleration side) in the case of a downward slope, the value becoming substantially 0 in the case of the flat ground. Therefore, the inclination of the road surface can be determined based on the value.

<Step S12: Upward Slope Determination Output>

The ECU 41 outputs an upward slope determination which indicates that the road surface on which the vehicle is stopped is an upward slope whose degree of inclination is equal to or larger than a predetermined degree of inclination which requires that the braking force of the electric parking brake be increased to be larger than normal, and the operation flow returns to the main routine.

<Step S13: Flat Ground Determination Output>

The ECU 41 outputs a flat ground determination which indicates that the road surface on which the vehicle is stopped is substantially flat and that the normal braking force of the electric power brake is sufficient, and the operation flow returns to the main routine.

<Step S14: Downward Slope Determination Output>

The ECU 41 outputs a downward slope determination which indicates that the road surface on which the vehicle is stopped is a downward slope whose degree of inclination is equal to or larger than a predetermined degree of inclination which requires that the braking force of the electric parking brake be increased to be larger than normal, and the operation flow returns to the main routine.

In addition, in the specification, the inclination determination should be such as to include both the upward slope determination and the downward slope determination.

<Inclination Determination Subroutine in High G Region>
<Step S21: Difference G Determination>

The ECU 41 calculates a difference G (Gd) which is obtained by subtracting the G sensor output SG from the post LPF reference G (Grf).

Then, if $Gd \geq C-Ch$, the operation flow proceeds to step S22, and if $-2C-Ch < Gd < C-Ch$, the operation flow proceeds to step S24.

Here, Ch denotes a correction value for the determination value C in the high G region and is a predetermined constant whose absolute value is smaller than that of the determination value and which is negative.

<Step S22: Upward Slope Determination Output>

The ECU 41 outputs an upward slope determination, and the operation flow returns to the main routine.

<Step S23: Flat Ground Determination Output>

The ECU 41 outputs a flat ground determination, and the operation flow returns to the main routine.

<Step S24: Downward Slope Determination Output>

The ECU 41 outputs a downward slope determination, and the operation flow returns to the main routine.

<Inclination Determination Subroutine for Back-up>
<Step S31: Flat Ground Determination Judgment>

The ECU 41 judges whether or not a flat ground determination is currently being performed, and if it is judged that the flat ground determination is being performed, the operation flow proceeds to step S32, and if in other cases, the operation flow returns to the main routine.

<Step S32: Stop Determination Timer Operation Judgment>

The ECU 41 activates a stop determination timer which counts a timer value t up as time elapses, so as to judge whether or not the time value t has become 0 or larger, and if the timer value t is 0 or larger, the operation flow proceeds to step S33, and if in other cases, the operation flow returns to the main routine.

Here, when the timer value t is other than 0, the stop determination timer is initialized (t←0) at a point in time at which the vehicle body speed is inputted in the main flow.

<Step S33: Stop Determination Timer Counting Up>

The ECU 41 counts the timer value t of the stop determination timer up by 1 (t←t+1), and the operation flow proceeds to step S34.

<Step S34: Timer Value Judgment>

The ECU 41 compares the timer value t of the stop determination timer with a stop determination value (a stop judgment count) which is set in advance, and if the timer value t is equal to the stop determination value, the operation flow proceeds to step S35, and if in other cases, the operation flow returns to the main routine. This stop determination value is set in consideration of a time in which an inclination determination is enabled based only on an output from the G sensor 43 which gets stabilized after the vehicle is stopped.

<Step S35: Capture of G Sensor Output SG>

The ECU 41 captures an output SG from the G sensor 43, and the operation flow proceeds to step S36.

<Step S36: G Sensor Output Judgment>

The ECU 41 compares the G sensor output SG which was captured in step S35 with a determination G (Gj) which is set in advance and a determination G (−Gj) whose polarity is reversed. This determination G (Gj) is a threshold value for determining whether or not a slope is such as to require an increase in the braking force of the parking brakes in response to outputting of the G sensor output SG.

In addition, if the G sensor output SG is smaller than −Gj, the operation flow proceeds to step S37, if the G sensor output SG is larger than the Gj, the operation flow proceeds to Step S39, and if in other cases, the operation flow proceeds to step S38.

Note that this step S36 is a stop inclination determination step at which inclination is determined while the vehicle is being stopped irrespective of the reference G and functions as a back-up inclination determination step at which inclination is determined again irrespective of the reference G, in the event that the reference G is compared with the G sensor output so as to perform a flat ground determination.

<Step S37: Upward Slope Determination Output>

The ECU 41 outputs an upward slope determination, and the operation flow proceeds to Step S40.

<Step S38: Flat Ground Determination Output>

The ECU 41 outputs a flat ground determination, and the operation flow proceeds to step S.40.

<Step S39: Downward Slope Determination Output>

The ECU 41 outputs a downward slope determination, and the operation flow proceeds to step S40.

<Step S40: Stop Determination Timer Stop>

The ECU 41 makes the timer value t of the stop determination timer be −1 (t←−1) and stops the stop determination timer, and the operation flow returns to the main routine.

Here, the inclination determinations that have been described heretofore are performed repeatedly at intervals of, for example, 20 milliseconds until the vehicle is stopped, and determination results so obtained are accumulated in a memory, not shown, that is provided in the ECU 41. Then, if, for example, 80% or more of the pieces of data on the series of inclination determination results that are so accumulated shows the upward or downward slope determination when the vehicle is stopped, the ECU 41 establishes a final inclination determination and judges that reapplication of the parking brakes 10 is necessary.

As this occurs, the controller 40 performs a reapplication control in which the braking forces of the parking brakes 10 are made to be the slope braking force which is increased to be larger than the flat ground braking force which is a braking force used when the vehicle is parked on the flat ground.

In addition, the electric parking brake apparatus of this embodiment includes a hill hold back-up function to perform a reapplication of the brakes irrespective of establishment of the inclination determination in the event that the vehicle restarts after the reapplication of the brakes by the hill hold function was performed and then stops before a predetermined vehicle speed condition is satisfied.

Figure 8:
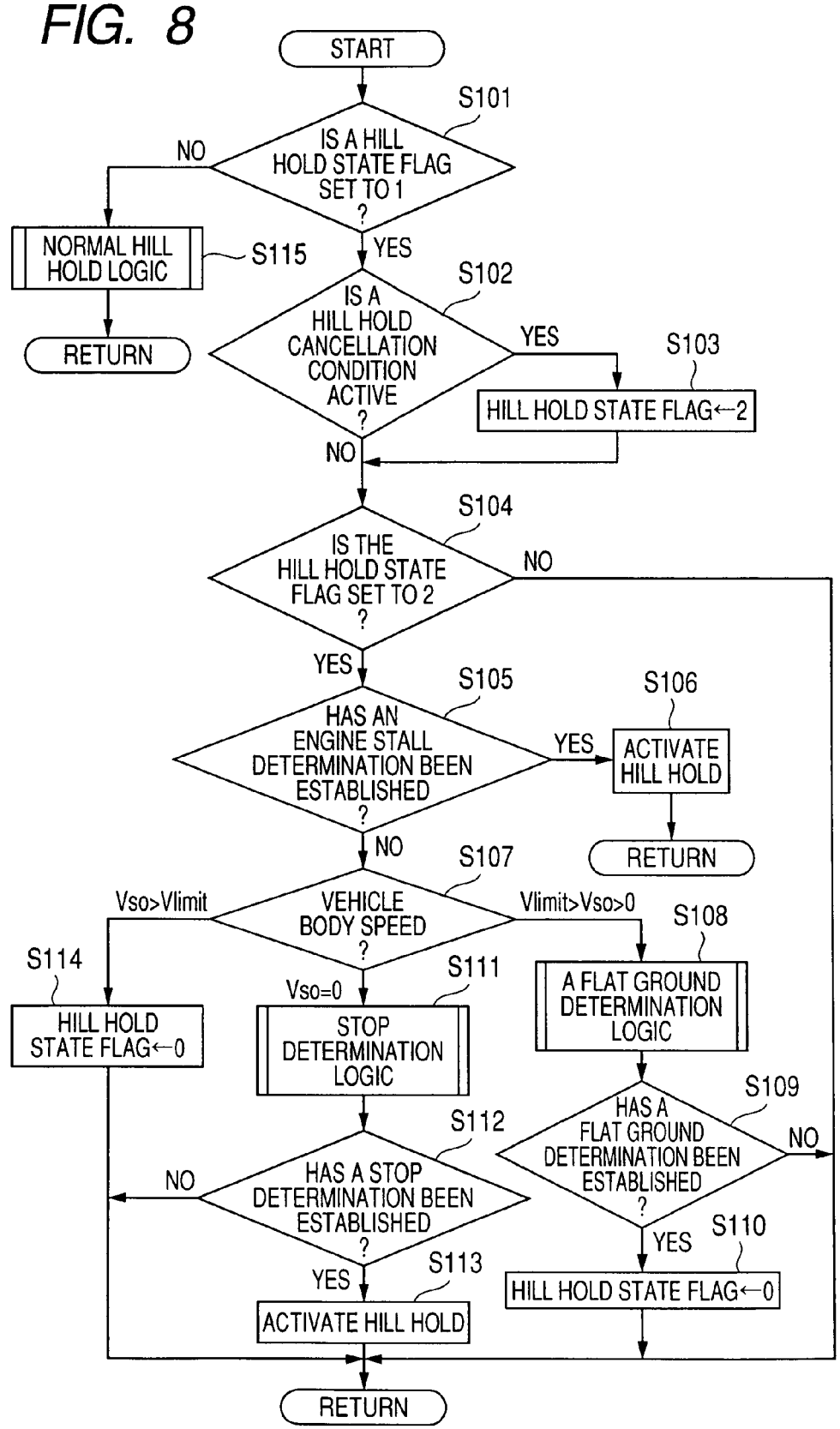
[FIG. 8] A flowchart showing a hill hold back-up logic in the electric parking brake apparatus shown in FIG. 1.

FIG. 8 is a flowchart showing the hill hold back-up function.

Hereinafter, the hill hold back-up function will be described sequentially step by step.

<Hill Hold Back-Up Function>
<Step S101: Hill Hold State Flag Judgment>

The ECU 41 judges whether or not the current hill hold flag is 1, and if the hill hold flag is 1, the operation flow proceeds to S102, and if in other cases, the operation flow proceeds to step S115.

Here, the hill hold state flag is a flag that is set to 0 when the vehicle is running normally, to 1 when the brakes are applied by reapplying the parking brakes 10, and to 2 until the predetermined vehicle speed condition is satisfied after the braking with the reapplication of the parking brakes 10 is cancelled, and is held by the ECU 41.

<Step S102: Hill Hold Cancellation Judgment>

The ECU 41 judges whether or not a hill hold cancellation condition which is a condition under which braking with the reapplication of the parking brakes 10 is cancelled has been satisfied. The satisfaction of the hill hold cancellation condition is judged based on controlling states of driving control portions such as a throttle pedal, a clutch pedal, a shift lever and the like which are not shown. The ECU 41 performs the relevant judgment based on pieces of information on the controlling states it receives from the vehicle side unit 60.

In addition, when the hill hold cancellation condition is satisfied (when the hill hold cancellation condition is active), the operation flow proceeds to step S103 only once when the relevant condition is satisfied, and when in other cases (including a state resulting after the hill hold cancellation condition has been satisfied), the operation flow proceeds to step S104.

Here, when the hill hold cancellation condition is satisfied, the actuator unit 20 loosens the parking brake cables 21 to shift the parking brakes 10 into the released state.

<Step S103: Hill Hold State Flag Change>

The ECU 41 sets the hill hold state flag to 2, and the operation flow proceeds to step S104.

<Step S104: Hill Hold State Flag Judgment>

The ECU 41 judges whether or not the hill hold state flag has been set to 2, and if the flag is now set to 2, the operation flow proceeds to step S105, and if in other cases, the operation flow returns (to step S101).

<Step S105: Engine Stall Determination>

The ECU 41 determines whether or not the engine stalls based on the current engine revolution speed that is provided from the vehicle side unit 60 and an output of the G sensor 43.

Specifically, if the current engine revolution speed is 0 and the G sensor 43 detects a longitudinal G fluctuation pattern which is generated specifically to a time when the engine stall is occurring, judging that the engine has stalled, the operation flow proceeds to step S106, and if in other cases, the operation flow proceeds to step S107.

<Step S106: Hill Holding Operation>

The ECU 41 activates the parking brakes 10 with the slope braking force, and the operation flow returns.

<Step S107: Vehicle Body Speed Judgment>

The ECU 41 compares the current vehicle body speed Vso with 0 and a predetermined set speed V limit, and if Vso is smaller than V limit but is larger than 0, the operation flow proceeds to step S108, if Vso is 0, the flow proceeds to step S111, and if Vso is equal to or larger than V limit, then the operation flow proceeds to step S114.

Here, V limit is set based on a vehicle speed at which a predetermined determination accuracy is obtained by an inclination determination logic which makes use of the above vehicle speed and is set to, for example, on the order of 12 km/h.

<Step S108: Flat Ground Determination Logic>

The inclination determination unit 41c of the ECU 41 executes a flat ground determination logic. Although being substantially a similar operation to the inclination determination logic, the flat ground determination logic is such as to establish a final flat ground determination in the event that for example, 90% or more of the results of judgments which were repeatedly performed at intervals of, for example, 20 milliseconds indicates flat ground determination. Namely, in this case, since an initial speed at which the vehicle starts deceleration is lower than V limit, it is difficult to secure the accuracy of inclination determination. However, in the event that the results of the judgments so made indicate with a probability of 90% or greater that the ground on which the vehicle is stopped is flat, judging that there exists a high possibility that the ground is flat, a final flat ground determination is made to be established.

<Step S109: Flat Ground Determination Establishment Judgment>

The ECU 41 judges whether or not the flat ground determination has been established in step S108, and if the flat ground determination is judged to have been established, then, the operation flow proceeds to step S110, whereas if the flat ground determination is judged not to have been established, the operation flow returns.

<Step S110: Hill Hold State Flag Change>

The ECU 41 sets the hill hold flag to 0, and the operation flow returns.

By this setting, the parking brakes 10 are activated with the flat ground braking force next time the vehicle is stopped.

<Step S111: Stop Determination Logic>

The stop determination unit 41a of the ECU 41 determines whether or not the vehicle has been brought to a complete stop (the vehicle has stopped).

Here, it is difficult for the vehicle speed sensor 61 to detect accurately the vehicle speed when the vehicle is running at an extremely low speed, for example, of the order of 1.6 km/h. Then, this stop determination is implemented by estimating a stopping timing of the vehicle based on, for example, a timing at which the indication speed of the vehicle speed sensor 61 becomes a predetermined detectable lower limit speed and a deceleration of the vehicle which results then.

<Step S112: Stop Determination Establishment Judgment>

The ECU 41 judges whether or not the stop determination has been established in step S111, and if the stop determination is judged to have been established, the operation flow proceeds to step S113, whereas if the stop determination is judged not to have been established, the operation flow returns.

<Step S113: Hill Hold Operation>

The Controller drives the actuator unit 20 so as to activate (apply) the parking brakes 10 with the slope braking force, and the operation flow returns.

<Step S114: Hill Hold State Flag Change>

The ECU 41 changes the hill hold state flag to 0, whereby next time the vehicle is stopped, the setting of the flat ground braking force or slope braking force is performed using the normal inclination determination logic.

<Step S115: Normal Hill Hold Logic>

The ECU 41 restores the logic using the normal inclination determination from the hill hold back-up logic.

According to the embodiment that has been described heretofore, the following advantages can be obtained.

In the event that the vehicle is brought to a stop again after the braking with the slope braking force (by reapplying the parking brakes) has been cancelled but before the vehicle speed has reached V limit, by automatically activating the parking brakes 10 with the slope braking force as long as the flat ground determination is not established even when the inclination determination is not established, the safer control can be implemented even in the event that an accurate inclination determination becomes difficult to be performed due to the lack of vehicle speed, thereby making it possible to increase the safety by preventing the start of the vehicle from the standstill.

By setting V limit, which is the vehicle speed condition, based on the lower limit speed at which inclination determination can be implemented with good accuracy in the inclination determination unit 41c of the ECU 41, in the event that the vehicle speed reaches or exceeds the lower limit speed, the setting of the braking force can be optimized by switching to the control which uses the normal inclination determination.

In the event that the vehicle is brought to a stop again after the braking with the slope braking force has been cancelled but before the vehicle speed has reached V limit, the frequency at which the parking brakes 10 are activated with the slope braking force is reduced by setting the flat ground braking force when the flat ground determination is established with the predetermined probability, whereby the requirement for the mechanical durability of the electric parking brake apparatus can be relaxed while securing the safety.

In the event that the engine is at a halt after the braking with the sloping braking force has been cancelled, by activating the parking brakes 10 with the slope braking force, the vehicle can be prevented from starting to move even when no vehicle speed signal is inputted as when the engine stalls so as to make the inclination determination difficult to be performed.

[Modified Example]

The invention is not limited to the embodiment that has been described heretofore but can be modified or changed variously, and such modifications or changes fall within the technical scope of the invention.

(1) While, in the embodiment that has been described above, the braking force of the parking brakes is set in the two stages of the flat ground braking force and the slope braking force, the braking force may be set in three or more stages or may be designed to change continuously in a stepless fashion, and as this occurs, the braking force may be set such that in the event that the vehicle is brought to a standstill again without satisfying the predetermined vehicle speed condition, a higher braking force is set in a more relaxed condition than the normal condition.

(2) The inclination determination method is not limited to that described in the embodiment but may be another method which utilizes information regarding vehicle speed.

(3) The configuration of the electric parking brake apparatus is not limited to that described in the embodiment but can be modified as required.

For example, whine the parking brake in the embodiment is such as to use the brake drum which is disposed on the inside diameter side of the brake disk (rotor) for the foot or service brake, the type of the parking brake may be of another type. For example, a common friction material may be shared between the disc brake or drum brake for the foot or service brake and the parking brake, so that the disc brake or drum brake can be integrated with the parking brake.

In addition, while the parking brake of the embodiment is such that the parking brake is driven via the parking brake cable using the electric actuator fixed to the body side, the invention is not limited thereto. For example, the invention can be applied to a so-called built-in type electric parking brake in which an electric actuator is provided on a wheel hub side so as to be integrated with the parking brake.

(4) While the vehicle of the embodiment is such as to be fitted with the manual transmission, with the control regarding the engine stall removed, the invention can be applied to, for example, vehicles fitted with an automatic transmission such as a torque converter type automatic transmission or a CVT, electric vehicles, hybrid vehicles using an engine and electric motors and the like.

What is claimed is:

1. An electric parking brake control apparatus for controlling an electric actuator for driving a parking brake comprising:
    an inclination determination unit that determines an inclination of a road surface based on at least a change of a vehicle speed; and
    a braking force setting unit that sets a braking force of the parking brake to a slope braking force according to an inclination of the road surface determined by the inclination determination unit when a vehicle is stopped on a slope,
    wherein the slope braking force is larger than a flat ground braking force set when a vehicle is stopped on a flat ground,
    wherein the braking force setting unit sets the braking force to the slope braking force, in an event that the vehicle is stopped again without experiencing a running over a predetermined vehicle speed after braking with the slope braking force has been cancelled by a restart of the vehicle.

2. The electric parking brake control apparatus according to claim 1, wherein in the event that the vehicle is stopped again without experiencing the running over the predetermined vehicle speed after braking with the slope braking force has been cancelled, the braking force setting unit activates the parking brake with the slope braking force even when an inclination determination by the inclination determination unit has not been established.

3. The electric parking brake control apparatus according to claim 1, wherein the predetermined vehicle speed is set based on a lower limit vehicle speed at which an inclination determination is enabled in the inclination determination unit.

4. The electric parking brake control apparatus according to claim 1, wherein in the event that the vehicle is stopped again without experiencing the running over the predetermined vehicle speed after braking with the slope braking force has been cancelled, the braking force setting unit sets the braking force to the flat ground braking force when a flat ground determination is established by the inclination determination unit.

5. The electric parking brake control apparatus according to claim 1, wherein the inclination determination unit determines the inclination by comparing the change of the vehicle speed with an output of an acceleration sensor.

6. The electric parking brake control apparatus according to claim 1, wherein the inclination determination unit determines the inclination by an output of the acceleration sensor after the vehicle is stopped and a predetermined time elapses,
    wherein the braking force setting unit sets the braking force based on the output of the acceleration sensor after the vehicle is stopped and the predetermined time elapses, in the event that the inclination determination unit determines the flat ground based on the change of the vehicle speed while running.

7. An electric parking brake control apparatus for controlling an electric actuator for driving a parking brake comprising:
    an inclination determination unit that determines an inclination of a road surface; and
    a braking force setting unit that sets a braking force of the parking brake to a slope braking force according to an inclination of the road surface determined by the inclination determination unit when the vehicle is stopped on a slope,
    wherein the slope braking force is larger than a flat ground braking force set when a vehicle is stopped on a flat ground, and
    wherein the braking force setting unit sets the parking brake to the slope braking force in an event that braking with the slope braking force has been cancelled and an engine is being stopped without experiencing a running over a predetermined vehicle speed.

8. An electric parking brake control method for controlling an electric actuator for driving a parking brake, the method comprising:

determining an inclination of a road surface based on at least a change of a vehicle speed;

setting a braking force of the parking brake to a slope braking force according to an inclination of the road surface when the vehicle is stopped on a slope, wherein the slope braking force is larger than a flat ground braking force set when a vehicle is stopped on a flat ground; and setting the braking force to the slope braking force, in an event that the vehicle is stopped again without experiencing a running over a predetermined vehicle speed after braking with the slope braking force has been cancelled by a restart of the vehicle.

9. The electric parking brake control method according to claim 8, further comprising:

activating the parking brake with the slope braking force, even when the determining of the inclination has not been established, in the event that the vehicle is stopped again without experiencing the running over the predetermined vehicle speed after braking with the slope braking force has been cancelled.

10. The electric parking brake control method according to claim 8, wherein the predetermined vehicle speed is set based on a lower limit vehicle speed at which the determining of the inclination is enabled.

11. The electric parking brake control method according to claim 8, further comprising:

setting the braking force to the flat ground braking force when a flat ground determination is established, in the event that the vehicle is stopped again without experiencing the running over the predetermined vehicle speed after braking with the slope braking force has been cancelled.

12. The electric parking brake control method according to claim 8, further comprising:

comparing the change of the vehicle speed with an output of an acceleration sensor so as to determine the inclination.

13. The electric parking brake control method according to claim 8, further comprising:

determining the inclination by an output of the acceleration sensor after the vehicle is stopped and a predetermined time elapses; and setting the braking force based on the output of the acceleration sensor after the vehicle is stopped and the predetermined time elapses, in an event that the flat ground is determined based on the change of the vehicle speed while running.

14. An electric parking brake control method for controlling an electric actuator for driving a parking brake, the method comprising:

determining an inclination of a road surface;

setting a braking force of the parking brake to a slope braking force according to the inclination when a vehicle is stopped on a slope, wherein the slope braking force is larger than a flat ground braking force set when a vehicle is stopped on a flat; and setting the parking brake to the slope braking force in an event that braking with the slope braking force has been cancelled and an engine is being stopped without experiencing a running over a predetermined vehicle speed.

15. The electric parking brake control device according to claim 1, wherein the braking force setting unit sets the braking force to the slope braking force, if the engine of the vehicle stalls while the vehicle speed is below a predetermined vehicle speed, after the braking with the slope braking force has been canceled by a restart of the vehicle.

16. The electric parking brake control device according to claim 1, wherein the braking force setting unit sets the braking force to the slope braking force, if, while the braking with the slope braking force has been canceled by a restart of the vehicle, the engine of the vehicle stalls while the vehicle speed is below a predetermined vehicle speed.

17. The electric parking brake control method according to claim 8, wherein said determining the inclination of the road comprises:

detecting a current vehicle speed;

comparing the current vehicle speed with an initial vehicle speed;

detecting a deceleration of the vehicle;

calculating a reference deceleration of the vehicle;

performing a low-pass filter (LPF) processing on the calculated reference deceleration of the vehicle;

determining a difference between the deceleration of the vehicle and the LPF-processed reference deceleration of the vehicle; and comparing said difference with a predetermined constant, wherein an upward slope determination is output if said difference comprises a larger value than the predetermined constant, wherein a flat ground determination is output if said difference comprises a substantially equal value as the predetermined constant, and wherein a downward slope determination is output if said difference comprises a smaller value than the predetermined constant.

18. The electric parking brake control method according to claim 17, wherein the reference deceleration of the vehicle is calculated based on the detected current vehicle speed.

* * * * *